(12) United States Patent
Imura et al.

(10) Patent No.: US 9,935,323 B2
(45) Date of Patent: Apr. 3, 2018

(54) FUEL CELL MODULE AND FUEL CELL STACK

(71) Applicant: SANYO Electric Co., Ltd., Osaka (JP)

(72) Inventors: Shinichiro Imura, Hyogo (JP); Takashi Yasuo, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 21 days.

(21) Appl. No.: 15/038,905

(22) PCT Filed: Feb. 18, 2015

(86) PCT No.: PCT/JP2015/000749
§ 371 (c)(1),
(2) Date: May 24, 2016

(87) PCT Pub. No.: WO2015/129206
PCT Pub. Date: Sep. 3, 2015

(65) Prior Publication Data
US 2017/0162883 A1    Jun. 8, 2017

(30) Foreign Application Priority Data

Feb. 27, 2014    (JP) .................................. 2014-036329

(51) Int. Cl.
*H01M 4/00* (2006.01)
*H01M 8/0297* (2016.01)
(Continued)

(52) U.S. Cl.
CPC ........... *H01M 8/0297* (2013.01); *H01M 4/86* (2013.01); *H01M 8/0267* (2013.01); *H01M 2004/8678* (2013.01)

(58) Field of Classification Search
CPC .... H01M 8/0297; H01M 4/86; H01M 8/0267; H01M 2004/8678
See application file for complete search history.

(56) References Cited

U.S. PATENT DOCUMENTS

2004/0175606 A1    9/2004    Komura et al.
2006/0286432 A1*  12/2006    Rakowski ................ C25F 3/24
                                                  429/442
(Continued)

FOREIGN PATENT DOCUMENTS

JP    2004-273264    9/2004
JP    2006-134588    5/2006
(Continued)

OTHER PUBLICATIONS

International Search Report of PCT application No. PCT/JP2015/000749 dated May 19, 2015.

*Primary Examiner* — Mark F. Huff
*Assistant Examiner* — Monique M Wills
(74) *Attorney, Agent, or Firm* — McDermott Will & Emery LLP (57) ABSTRACT

A fuel cell module includes a first fuel cell layer and second fuel cell layer. Each fuel cell layer includes a plurality of membrane electrode assemblies arranged in a planar shape. Each membrane electrode assembly includes an electrolyte membrane, an anode disposed on one surface of the electrolyte membrane, and a cathode disposed on the other surface of the electrolyte membrane. Each fuel cell layer also includes interconnectors each of which electrically connects the anode of one of adjacent membrane electrode assemblies to the cathode of the other. The first fuel cell layer and second fuel cell layer are arranged so that one polarity of each membrane electrode assembly of the first fuel cell layer is opposed to the same polarity of each membrane electrode assembly of the second fuel cell layer.

11 Claims, 6 Drawing Sheets

(51) Int. Cl.
*H01M 4/86* (2006.01)
*H01M 8/0267* (2016.01)

(56) References Cited

U.S. PATENT DOCUMENTS

| | | | |
|---|---|---|---|
| 2008/0199751 A1* | 8/2008 | Giddey | H01M 8/0206 |
| | | | 429/434 |
| 2008/0206619 A1 | 8/2008 | Imura et al. | |
| 2010/0068562 A1 | 3/2010 | Fukushima et al. | |
| 2010/0248069 A1 | 9/2010 | Kabumoto et al. | |
| 2011/0045375 A1 | 2/2011 | Makita et al. | |
| 2014/0242476 A1* | 8/2014 | Kuhne | C25B 15/02 |
| | | | 429/407 |

FOREIGN PATENT DOCUMENTS

| | | |
|---|---|---|
| JP | 2008-108677 | 5/2008 |
| JP | 2008-210714 | 9/2008 |
| JP | 2009-231111 | 10/2009 |
| JP | 2010-086808 | 4/2010 |
| JP | 2010-231892 | 10/2010 |
| JP | 2010-244721 | 10/2010 |

* cited by examiner

FUEL CELL MODULE AND FUEL CELL STACK

TECHNICAL FIELD

The present invention relates to a fuel cell module for generating power through an electrochemical reaction between hydrogen and oxygen, and a fuel cell stack formed by stacking a plurality of fuel cell modules.

BACKGROUND ART

In recent years, attention has focused on a fuel cell that has a high energy conversion efficiency and does not generate a harmful material during a power generation reaction. As one example of such a fuel cell, a polymer electrolyte fuel cell operating at a low temperature of 100° C. or less is known.

The polymer electrolyte fuel cell has a fundamental structure in which a solid polymer membrane as an electrolyte membrane is disposed between an anode and a cathode. The polymer electrolyte fuel cell is a device where hydrogen is supplied to the anode, oxidant gas containing oxygen is supplied to the cathode, and power through the following electrochemical reaction is generated.

Anode: $H_2 \rightarrow 2H^+ + 2e^-$ (1)

Cathode: $\frac{1}{2}O_2 + 2H^+ + 2e^- \rightarrow H_2O$ (2)

In the anode, the supplied hydrogen is decomposed into hydrogen ions and electrons as shown in formula (1). The hydrogen ions travel toward the cathode through the solid polymer electrolyte membrane, and the electrons travel to the anode through an external circuit. In the cathode, the oxygen contained in the oxidant gas supplied to the cathode reacts with the hydrogen ions and electrons that have traveled from the anode, thereby generating water as shown in formula (2). Thus, in the external circuit, the electrons travel from the anode to the cathode, and hence power can be taken out.

Particularly, the polymer electrolyte fuel cell has a lower operating temperature and a higher output density than those of other types of fuel cells. Recently, especially, the polymer electrolyte fuel cell has been expected to be applied to a power source of a mobile device and a power source of an on-vehicle device. As such a polymer electrolyte fuel cell, Patent Literature 1 discloses a fuel cell stack formed by stacking planar-array fuel cell layers each of which includes a plurality of membrane electrode assemblies arranged in a planar shape.

CITATION LIST

Patent Literature

PTL 1: Unexamined Japanese Patent Publication No. 2004-273264

SUMMARY OF THE INVENTION

Technical Problem(s)

The fuel cell stack disclosed by Patent Literature 1, however, has a structure in which layers are stacked via respective separators installed on the anode and cathode. Therefore, correspondingly to the installation of the separators, the weight and volume increase disadvantageously.

The present invention addresses the above-mentioned problem. The objective of the present invention is to make a fuel cell module and fuel cell stack lightweight and compact with simple configurations.

Solution(s) to Problem(s)

A fuel cell module includes a first fuel cell layer and second fuel cell layer. Each fuel cell layer includes the following components:

a plurality of membrane electrode assemblies arranged in a planar shape, each of which includes an electrolyte membrane, an anode disposed on one surface of the electrolyte membrane, and a cathode disposed on the other surface of the electrolyte membrane; and interconnectors each of which electrically connects the anode of one of adjacent membrane electrode assemblies to the cathode of the other.

The first fuel cell layer and second fuel cell layer are arranged so that one polarity of each membrane electrode assembly of the first fuel cell layer is opposed to the same polarity of each membrane electrode assembly of the second fuel cell layer.

Advantageous Effect(s) of Invention

In the fuel cell module of one aspect of the present invention, the first fuel cell layer and second fuel cell layer are arranged so that one polarity of each membrane electrode assembly of the first fuel cell layer is opposed to the same polarity of each membrane electrode assembly of the second fuel cell layer. Therefore, the space through which hydrogen gas flows or the space through which oxidant gas containing oxygen flows can be shared. As a result, a separator can be eliminated, and the weight reduction and compaction can be achieved.

DESCRIPTION OF EMBODIMENT(S)

An exemplary embodiment of the present invention is described with reference to the accompanying drawings.

The same or equivalent components and members shown in the drawings are denoted with the same reference marks, and duplicate descriptions are omitted as appropriate. The exemplary embodiment does not restrict the invention, but is an example. All features and combinations described in the exemplary embodiment are not always essential to the invention.

Example 1

Figure 1:
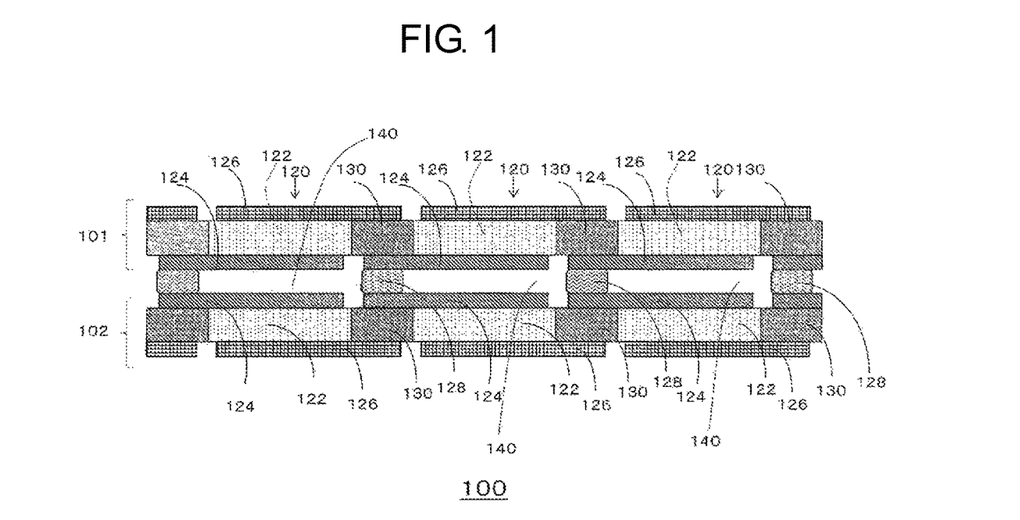
FIG. 1 is a schematic sectional view of a fuel cell module in accordance with example 1.

FIG. 1 is a schematic sectional view showing the configuration of a fuel cell module in accordance with example 1. As shown in FIG. 1, fuel cell module 100 includes first fuel cell layer 101, second fuel cell layer 102, and fixing members 128.

First fuel cell layer 101 and second fuel cell layer 102 are arranged via fixing members 128 so that each anode catalyst layer 124 of one fuel cell layer is opposed to each anode catalyst layer 124 of the other fuel cell layer. In such arrangement, fuel gas space 140 through which hydrogen gas flows is formed, and hence a conventionally used separator can be eliminated.

Each of first fuel cell layer 101 and second fuel cell layer 102 includes a plurality of membrane electrode assemblies 120 and interconnectors 130 that are arranged in a planar shape. Each membrane electrode assembly 120 includes electrolyte membrane 122, anode catalyst layer 124 disposed on one surface of electrolyte membrane 122, and cathode catalyst layer 126 that is disposed on the other surface of electrolyte membrane 122 and is at least partially opposed to anode catalyst layer 124.

Anode catalyst layers 124 of membrane electrode assemblies 120 are disposed on one-side surfaces of electrolyte membranes 122 so that anode catalyst layers 124 are separate from each other. Cathode catalyst layers 126 of membrane electrode assemblies 120 are disposed on the-other-side surfaces of electrolyte membranes 122 so that cathode catalyst layers 126 are separate from each other. Electrolyte membrane 122 is sandwiched and held between a pair of anode catalyst layer 124 and cathode catalyst layer 126 to form membrane electrode assembly 120 (sometimes referred to as "single cell").

Hydrogen is supplied as fuel gas to anode catalyst layers 124. Air is supplied as an oxidant to cathode catalyst layers 126. Each membrane electrode assembly 120 generates power through an electrochemical reaction between the hydrogen and the oxygen in the air.

Each of anode catalyst layer 124 and cathode catalyst layer 126 includes ion exchangers, catalyst particles, and, in some cases, carbon particles carrying catalyst particles.

The ion exchangers included in each of anode catalyst layer 124 and cathode catalyst layer 126 are used for improving the adhesion between the catalyst particles and each electrolyte membrane 122. Examples of a catalyst metal include a single element and an alloy selected from Sc, Y, Ti, Zr, V, Nb, Fe, Co, Ni, Ru, Rh, Pd, Pt, Os, Ir, lanthanide series element, and actinide series element. Furnace black, acetylene black, ketjen black, or carbon nanotube may be used as the carbon particles when a catalyst is carried. The thickness of each of anode catalyst layer 124 and cathode catalyst layer 126 is about 10 to 40 µm, for example.

Each electrolyte membrane 122, which preferably shows a high ion conductivity in a wet state, serves as an ion-exchange membrane for moving protons between anode catalyst layer 124 and cathode catalyst layer 126. Electrolyte membranes 122 are made of a solid polymer material such as a fluorine-containing polymer or a nonfluorine polymer. For example, electrolyte membranes 122 can be made of a sulfonic acid type perfluorocarbon polymer, a polysulfone resin, or a perfluorocarbon polymer having a phosphonic acid group or carboxylic acid group. An example of the sulfonic acid type perfluorocarbon polymer is Nafion membrane (manufactured by DuPont in the U.S.A.: registered trademark). Also, an example of the nonfluorine polymer is a sulfonated aromatic polyether ether ketone, or a polysulfon. The thickness of electrolyte membrane 122 is about 10 to 200 µm, for example.

Each interconnector 130 is a member for electrically interconnecting adjacent single cells, by creating an electric path from anode catalyst layer 124 of one of adjacent membrane electrode assemblies 120 to cathode catalyst layer 126 of the other of adjacent membrane electrode assemblies 120.

Each fixing member 128 can be disposed between anode catalyst layer 124 formed on each interconnector 130 of first fuel cell layer 101 and anode catalyst layer 124 formed on each interconnector 130 of second fuel cell layer 102.

First fuel cell layer 101 and second fuel cell layer 102 are arranged via fixing members 128 so that each anode catalyst layer 124 of one fuel cell layer is opposed to each anode catalyst layer 124 of the other fuel cell layer. In such arrangement, shared fuel gas spaces 140 through which hydrogen gas flows are formed, and a separator that is conventionally used for flow of hydrogen gas can be eliminated.

Preferably, each fixing member 128 is arranged for each interconnector 130. In such arrangement, the phenomenon that fuel gas spaces 140 expand due to the pressure of the hydrogen gas can be suppressed, and break of first fuel cell layer 101 or second fuel cell layer 102 can be prevented.

Fixing members 128 may contain a conductive material such as carbon, nickel, copper, or iron.

Example 2

Figure 2:
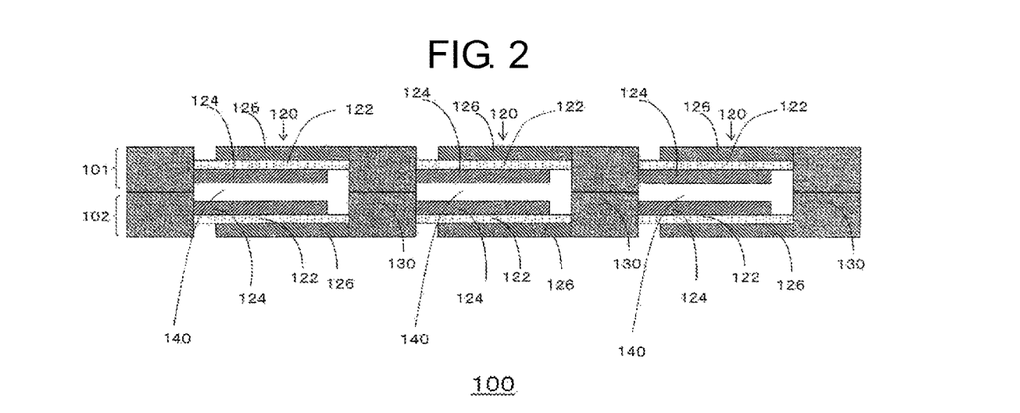
FIG. 2 is a schematic sectional view of a fuel cell module in accordance with example 2.

FIG. 2 is a schematic sectional view showing the configuration of fuel cell module 100 in accordance with example 2. As shown in FIG. 2, the difference from example 1 is that each interconnector 130 projects over each anode catalyst layer 124. Thus, each interconnector 130 can serve as each fixing member 128 of example 1. As other differences, interconnectors 130 and cathode catalyst layers 126 are disposed on substantially the same plane, and each anode catalyst layer 124 and cathode catalyst layer 126 adjacent to it are electrically interconnected in series via a side surface of each interconnector 130.

In fuel cell module 100 in accordance with example 2, interconnectors 130 serve as fixing members 128 of example 1. Therefore, additional installation of fixing members 128 is not required and hence further compaction can be achieved.

Figure 3:
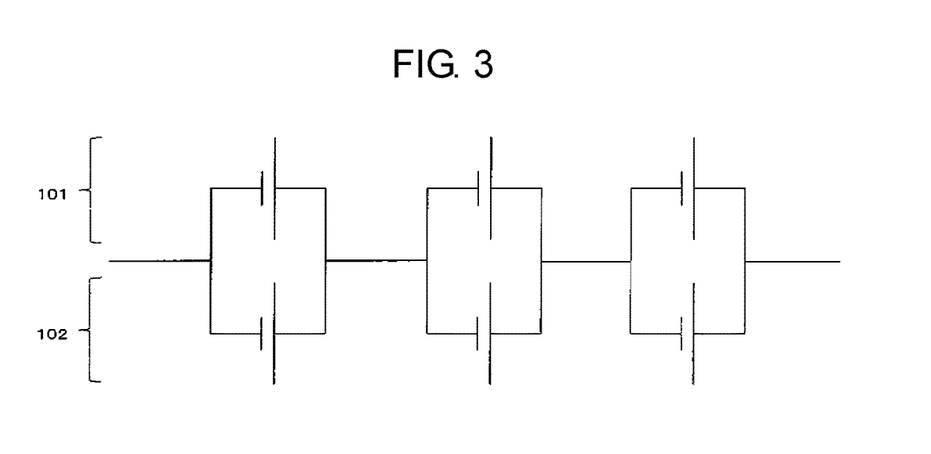
FIG. 3 is a schematic diagram showing an electric circuit when configurations of example 1 and example 2 are employed.

FIG. 3 is a schematic diagram showing an electric circuit in example 1 and example 2. Fixing members 128 are made of a conductive material as shown in example 1, or interconnectors 130 serve as fixing members as shown in example 2. Therefore, each interconnector 130 of first fuel cell layer 101 can be electrically connected to each interconnector 130 of second fuel cell layer 101, and hence single cells opposed to each other are interconnected in parallel as shown in FIG. 3. As a result, even when the output of a single cell varies, the whole output can be stabilized.

Example 3

Figure 4:
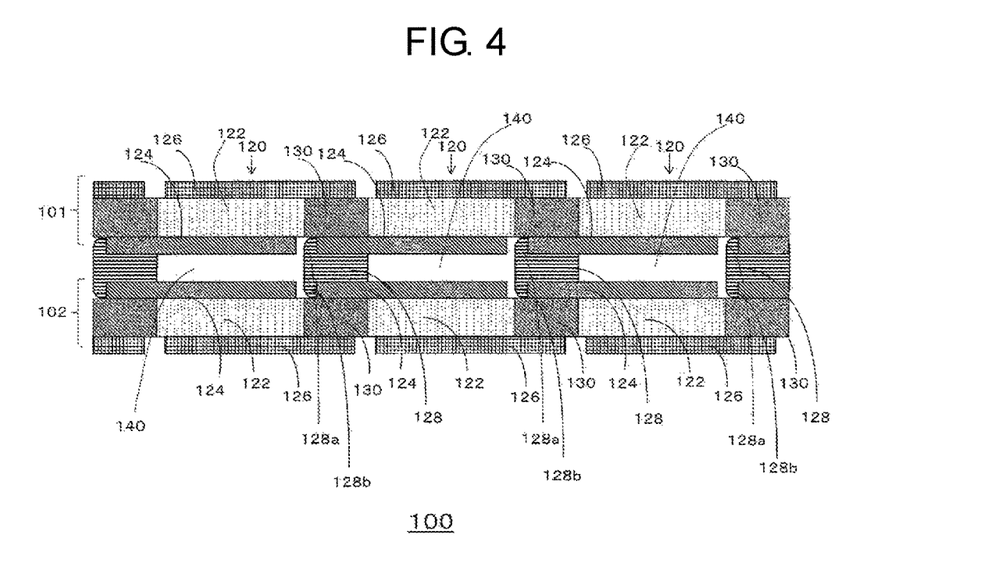
FIG. 4 is a schematic sectional view of a fuel cell module in accordance with example 3.

FIG. 4 is a schematic sectional view showing the configuration of fuel cell module 100 in accordance with example 3. As shown in FIG. 4, the difference from example 1 is that fixing members 128 are made of an insulating material. In order to increase the fixing force of fixing members 128, projections 128a and 128b of each fixing member 128 can be disposed in a clearance between anode catalyst layers 124 of membrane electrode assemblies 120.

Example 4

Figure 5:
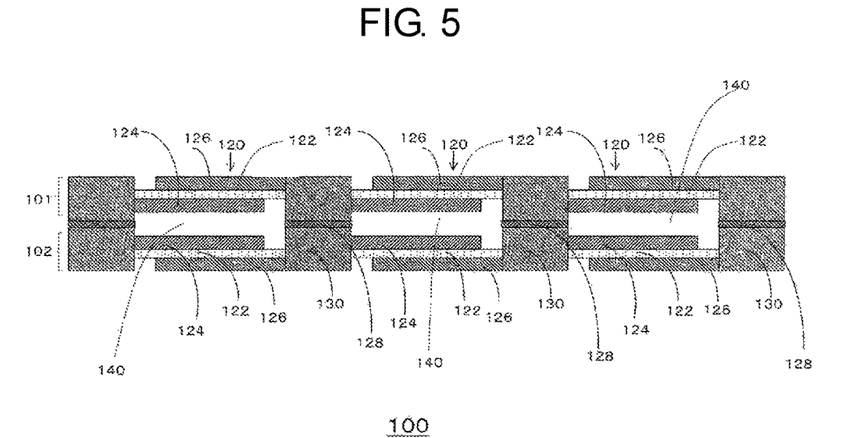
FIG. 5 is a schematic sectional view of a fuel cell module in accordance with example 4.

FIG. 5 is a schematic sectional view showing the configuration of fuel cell module 100 in accordance with example 4. As shown in FIG. 5, example 4 has a configuration substantially equivalent to that of example 2 except that each insulating fixing member 128 is interposed between each interconnector 130 of first fuel cell layer 101 and each interconnector 130 of second fuel cell layer 102.

In example 3 and example 4, fixing members 128 are made of an insulating material. Therefore, even if some positional displacement occurs when first fuel cell layer 101 and second fuel cell layer 102 are arranged so as to face each other, a short circuit can be prevented from being caused by a contact between each anode catalyst layer 124 of first fuel cell layer 101 and its adjacent anode catalyst layer 124 of second fuel cell layer 102.

Figure 6:
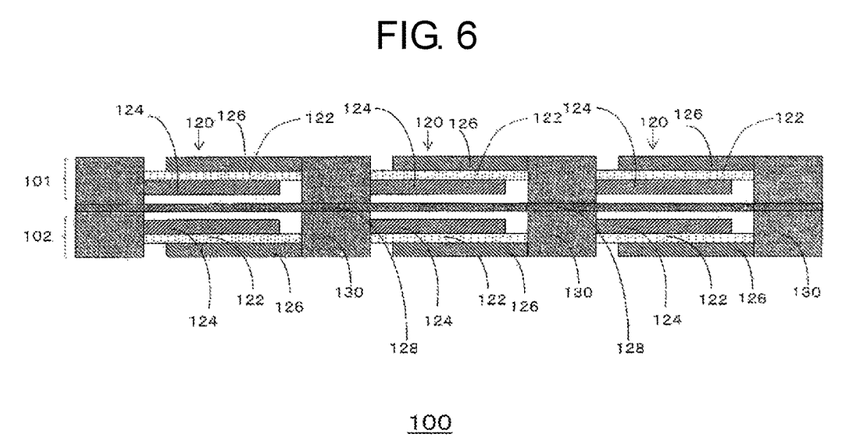
FIG. 6 is a schematic sectional view showing that fixing member 128 has an insulating sheet shape over the whole surface.

Although not shown, interconnectors 130 may project from the surfaces of cathode catalyst layers 126. As shown in FIG. 6, each fixing member 128 may have an insulating sheet shape over the whole surface of each membrane electrode assembly 120. In this case, preferably, the insulating sheet passes gas such as hydrogen gas.

Figure 7:
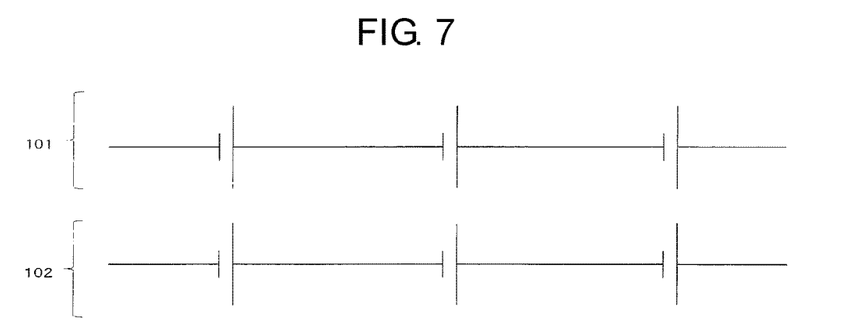
FIG. 7 is a schematic diagram showing an electric circuit when configurations of example 3 and example 4 are employed.

FIG. 7 is a schematic diagram showing an electric circuit in example 3 and example 4. Since fixing members 128 are made of an insulating material or insulating fixing member 128 is interposed between interconnectors 130, single cells are not interconnected in parallel as shown in FIG. 7.

Although not shown, first fuel cell layer 101 may be electrically connected to second fuel cell layer 102 at ends, and hence first fuel cell layer 101 may be connected to second fuel cell layer 102 in parallel.

Example 5

Figure 8:
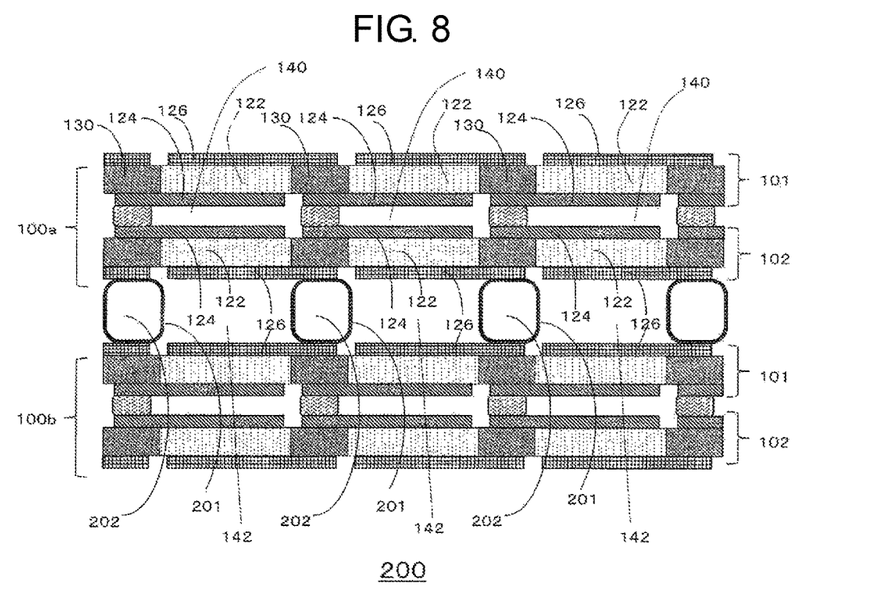
FIG. 8 is a schematic sectional view of a fuel cell stack in accordance with example 5.

FIG. 8 is a schematic sectional view of fuel cell stack 200 in accordance with example 5. Fuel cell stack 200 includes first fuel cell module 100a and second fuel cell module 100b. These fuel cell modules are stacked via cooling units 201 for cooling the fuel cell modules.

Each of first fuel cell module 100a and second fuel cell module 100b includes first fuel cell layer 101 and second fuel cell layer 102.

First fuel cell module 100a and second fuel cell module 100b are arranged so that each cathode catalyst layer 126 of second fuel cell layer 102 included in first fuel cell module 100a is opposed to each cathode catalyst layer 126 of first fuel cell layer 101 included in second fuel cell module 100b.

Each cooling unit 201 may include refrigerant flow channel 202. Especially, the temperature on the cathode side is apt to become higher than that on the anode side. Therefore, it is particularly preferable that cooling units 201 including refrigerant flow channel 202 are disposed on the cathode side. As the refrigerant, water, alcohol, or oil can be employed.

In such arrangement, oxidant gas spaces 142 including oxygen gas can be formed, and hence a separator used for flow of oxidant gas is not required. Therefore, the fuel cell can be made compact. Since the temperature on the cathode side is apt to become higher than that on the anode side, it is particularly preferable that cooling units 201 are disposed on the cathode side.

In FIG. 8, each cooling unit 201 is disposed between cathode catalyst layers 126 of first fuel cell layer 101 or between cathode catalyst layers 126 of second fuel cell layer 102. However, each cooling unit 201 may be disposed on each interconnector 130 of first fuel cell layer 101 or second fuel cell layer 102. Even when each cooling unit 201 is disposed on each interconnector 130, dispersion of the oxidant gas to the cathode is not disturbed.

It is particularly preferable that cooling units 201 are made of an insulating material. Therefore, a more lightweight resin, namely an insulating material such as anodized aluminum, can be employed. The weight of the fuel cell can be further reduced.

Furthermore, heat radiation fins may be employed as cooling units 201. By installing the heat radiation fins, cooling can be performed by the oxidant gas to be supplied to the cathode. Therefore, addition of a refrigerant such as water, alcohol, or oil is not required.

Example 6

Figure 9:
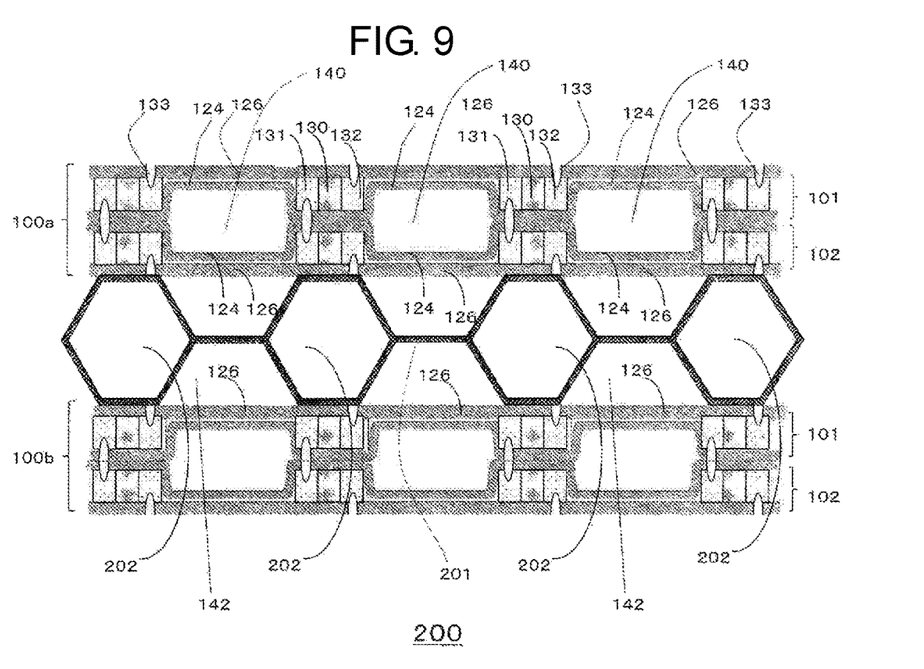
FIG. 9 is a schematic sectional view of a fuel cell stack in accordance with example 6.

FIG. 9 is a schematic sectional view of fuel cell stack 200 in accordance with example 6. Fuel cell stack 200 includes first fuel cell module 100a and second fuel cell module 100b. These fuel cell modules are stacked via cooling unit 201.

First fuel cell module 100a includes first fuel cell layer 101 and second fuel cell layer 102, and the fuel cell layers are arranged so that each anode catalyst layer 124 of first fuel cell layer 101 is opposed to each anode catalyst layer 124 of second fuel cell layer 102. In such arrangement, fuel gas spaces 140 through which hydrogen gas flows are formed, and a separator that is conventionally used for flow of hydrogen gas can be eliminated.

First insulating layer 131 and second insulating layer 132 are disposed on the opposite ends of each interconnector 130 of first fuel cell layer 101 or second fuel cell layer 102. In order to interconnect adjacent single sells in series, anode catalyst layer 124 existing on each first insulating layer 131 and the cathode catalyst layer existing on each second insulating layer 132 are removed by laser or the like, thereby forming clearances 133.

As shown in FIG. 9, each catalyst layer on each interconnector 130 of first fuel cell layer 101 is in contact with each catalyst layer on each interconnector 130 of second fuel cell layer 102. Therefore, similarly to example 2, additional installation of fixing member 128 is not required, and further compaction can be achieved. As shown in FIG. 9, cooling unit 201 may be integrally formed. In this case, a hole for passing gas may be formed in cooling unit 201.

Figure 10:
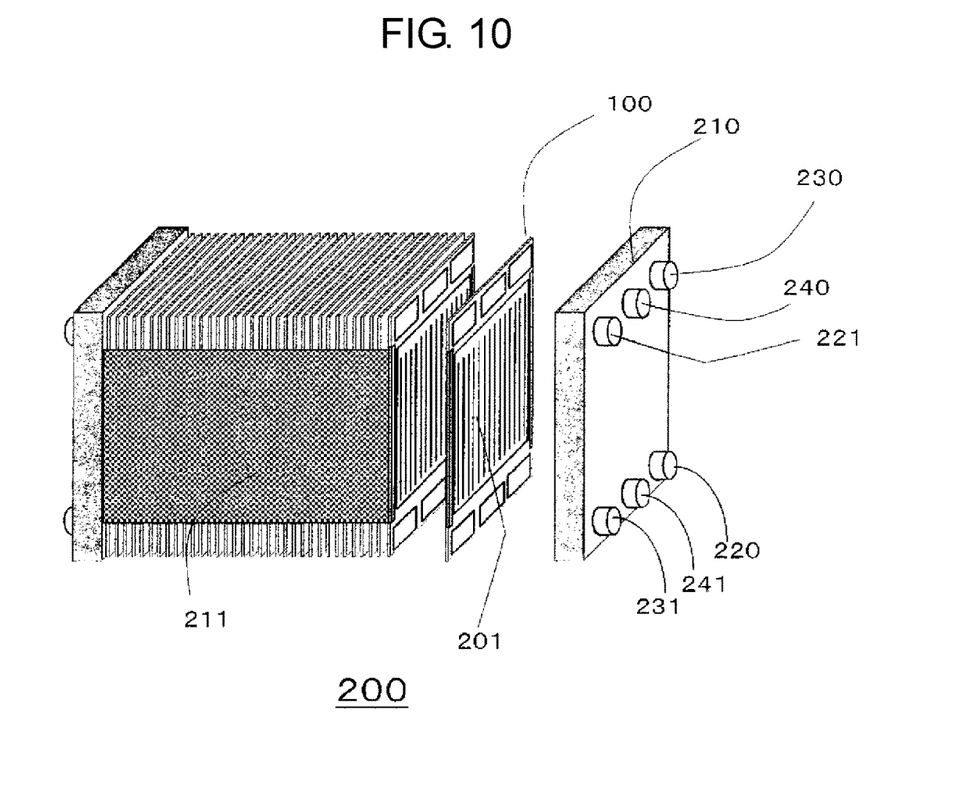
FIG. 10 is an exploded perspective view showing the configuration of a fuel cell stack including a fuel cell module of the present exemplary embodiment.

FIG. 10 is an exploded perspective view showing the configuration of a fuel cell stack including the fuel cell modules in accordance with the above-mentioned example. As shown in FIG. 10, a plurality of fuel cell stacks are fixed using current collection unit 211, and a plurality of fuel cell modules can be electrically interconnected in series or in parallel.

As shown in FIG. 10, each end plate 210 may include manifold 220 for hydrogen gas supply, manifold 221 for hydrogen gas exhaust, manifold 230 for oxidant gas supply, manifold 231 for oxidant gas exhaust, manifold 240 for cooling water supply, and manifold 241 for cooling water exhaust.

End plates 210 do not contribute to current collection, so that it is particularly preferable that end plates 210 are made of an insulating material. Thus, a more lightweight resin, namely an insulating material such as anodized aluminum, can be employed. The weight of the fuel cell can be further reduced.

In the present example, first fuel cell layer 101 and second fuel cell layer 102 are arranged so that anode catalyst layer 124 of each membrane electrode assembly 120 of first fuel cell layer 101 is opposed to anode catalyst layer 124 of each membrane electrode assembly 120 of second fuel cell layer 102. However, the fuel cell layers may be arranged so that cathode catalyst layer 126 of each membrane electrode assembly 120 of first fuel cell layer 101 is opposed to cathode catalyst layer 126 of each membrane electrode assembly 120 of second fuel cell layer 102.

The invention claimed is:

1. A fuel cell module comprising:
a first fuel cell layer; and
a second fuel cell layer facing the first fuel cell layer, wherein:
each of the first fuel cell layer and the second fuel cell layer includes a plurality of membrane electrode assemblies arranged in a planar shape, and a plurality of interconnectors,
each of the plurality of membrane electrode assemblies includes:
an electrolyte membrane;
an anode disposed on a first surface of the electrolyte membrane; and
a cathode disposed on a second surface of the electrolyte membrane,
each of the plurality of interconnectors is configured to connect the anode of one of adjacent membrane electrode assemblies to the cathode of the other adjacent membrane electrode assemblies such that the plurality of membrane electrode assemblies are electrically connected in series within each of the first fuel cell layer and the second fuel cell layer, and
the first fuel cell layer and the second fuel cell layer are arranged so that one polarity of each of the plurality of membrane electrode assemblies of the first fuel cell layer is opposed to the one polarity of each of the plurality of membrane electrode assemblies of the second fuel cell layer.

2. The fuel cell module according to claim 1, further comprising
fixing members disposed between the interconnectors of the first fuel cell layer and the interconnectors of the second fuel cell layer.

3. The fuel cell module according to claim 2, wherein each of the fixing members includes a conductive material for electrically connecting each of the interconnectors of the first fuel cell layer to each of the interconnectors of the second fuel cell layer.

4. The fuel cell module according to claim 2, wherein the fixing members are made of an insulating material.

5. The fuel cell module according to claim 1, wherein the one polarity corresponds to the anode.

6. A fuel cell stack comprising:
a plurality of the fuel cell modules according to claim 1; and
a cooling unit disposed on the interconnectors of the first fuel cell layer or the second fuel cell layer of the fuel cell module,
wherein the plurality of the fuel cell modules are stacked via the cooling unit.

7. The fuel cell stack according to claim 6, wherein the cooling unit is made of an insulating material.

8. A fuel cell stack comprising:
a plurality of the fuel cell modules according to claim 2; and
a cooling unit disposed on the interconnectors of the first fuel cell layer or the second fuel cell layer of the fuel cell module,
wherein the plurality of the fuel cell modules are stacked via the cooling unit.

9. A fuel cell stack comprising:
a plurality of the fuel cell modules according to claim 3; and
a cooling unit disposed on the interconnectors of the first fuel cell layer or the second fuel cell layer of the fuel cell module,
wherein the plurality of the fuel cell modules are stacked via the cooling unit.

10. A fuel cell stack comprising:
a plurality of the fuel cell modules according to claim 4; and
a cooling unit disposed on the interconnectors of the first fuel cell layer or the second fuel cell layer of the fuel cell module,
wherein the plurality of the fuel cell modules are stacked via the cooling unit.

11. A fuel cell stack comprising:
a plurality of the fuel cell modules according to claim 5; and
a cooling unit disposed on the interconnectors of the first fuel cell layer or the second fuel cell layer of the fuel cell module,
wherein the plurality of the fuel cell modules are stacked via the cooling unit.

* * * * *